United States Patent [19]

Huntzinger et al.

[11] 3,879,313

[45] Apr. 22, 1975

[54] STABILIZATION OF VINYL RESIN FOAM SYSTEMS

[76] Inventors: Elwood E. Huntzinger, 616 Vernon Rd., Springfield, Pa. 19064; Nelson N. Schwartz, 224 Lindbergh Ave., Broomall, Pa. 19008

[22] Filed: Aug. 8, 1973

[21] Appl. No.: 386,613

Related U.S. Application Data

[63] Continuation-in-part of Ser. No. 149,325, June 2, 1971, Pat. No. 3,824,204.

[52] U.S. Cl...... 260/2.5 P; 260/23 AR; 260/31.8 R; 260/33.6 UA; 260/33.8 UA; 260/45.7 R; 260/78.5 E; 260/89.5 A; 260/899
[51] Int. Cl. ............................................. C08f 47/10
[58] Field of Search................................... 260/2.5 P

[56] References Cited
UNITED STATES PATENTS

| | | | |
|---|---|---|---|
| 3,417,038 | 12/1968 | Soltys | 260/2.5 P |
| 3,454,507 | 7/1969 | Wluka | 260/2.5 P |
| 3,717,595 | 2/1973 | Huntzinger et al. | 260/2.5 P |

OTHER PUBLICATIONS

Monomeric Acrylic Esters, Edward H. Riddle, Rohn and Haas Co., Rheinhold Pub. Corp., 1954, N.Y., pp. 56–58.

*Primary Examiner*—Morton Foelak
*Attorney, Agent, or Firm*—Harold A. Hormann; Barry Moyermann

[57] ABSTRACT

Vinyl resin foam products having desirable characteristics including fine uniform cellular structure and low density are prepared with extended processing latitude from a foamable precursor composition which includes as stabilizing agent an effective amount of a composition comprising the reaction product, having an intrinsic viscosity, $[\eta]$, in deciliters per gram, determined in chloroform at 30°C., of less than about 0.35, of the polymerization of the monomeric esters of methacrylic acid and alcohols having from 3 to 5 carbon atoms, effected in the presence of chain transfer agents.

6 Claims, No Drawings

STABILIZATION OF VINYL RESIN FOAM SYSTEMS

This is a division of application Ser. No. 149,325, filed June 2, 1971, now U.S. Pat. No. 3,824,204.

BACKGROUND OF THE INVENTION

1. Field of the Invention

This invention concerns the stabilization of vinyl resin foam systems to provide cellular or porous resinous bodies.

2. Prior Art

Vinyl plastics of the type generally known as polyvinyl chloride or PVC constitute a large segment of the plastics art. The preparation and use of foamed polyvinyl chloride falls within a fairly narrow area of the vinyl plastics art. Typical general prior art appears in such U.S. Pat. Nos. as 2,056,796; 2,960,728; 3,093,525; 3,050,412; 3,063,110; 3,197,472; 3,267,197; 3,270,032; and 3,284,545. More closely related are U.S. Pat. Nos. 3,399,107 and 3,417,038 of which 3,399,107 concerns the use of homopolymeric methacrylate esters in relatively high concentrations in the preparation of certain cellular polyvinyl chloride products.

The present invention brings to the art an effective and economical stabilizing agent capable of providing foamed polyvinyl chloride and polyvinyl chloride products not only with improvements in their formation but also with improvements in the product such as have been previously unattainable with the ease and consistency now made possible.

SUMMARY OF THE INVENTION

This invention concerns the stabilization of polyvinyl chloride plastic compositions, having foamed cellular structures during their formation and transformation to final form. The precursor plastic compositions comprise a vinyl resin and a plasticizing agent. Provision for the creation of the foam or cellular structure is generally made by inclusion in the precursor composition of a blowing agent which may, however, be reduced in amount or eliminated entirely by mechanical, i.e., froth, technique in creation of the foamed or cellular structure. Stabilization of the foam, along with other improvements described herein below, is obtained when there is present with the precursor materials during the foaming and fusion step or steps an amount in the range of 0.05 to 2.0 part by weight based on the polymeric material as herein defined per 100 parts by weight of fusible resin in the formulation a polymeric material having an intrinsic viscosity $[\eta]$ at $30°$ $CHCl_3$ in the range of 0.05 to 0.35 and obtained as the reaction product of the polymerization of one or more of the monomeric methacrylate esters of $C_3$ to $C_5$ alcohols with a chain transfer agent and a polymerization initiator all dissolved in a suitable solvent.

The intrinsic viscosity, $[\eta]$, in deciliters per gram is defined in the Polymer Handbook, J. Brandrup & E. H. Immergut, Interscience Publishers, New York, 2nd Printing, 1966, pp IV 1,2. The molecular weight of a polymer is related to its intrinsic viscosity by the equation:

$$[\eta] = kM$$

in which M is the molecular weight, $k$ and $\alpha$ are constants, and $\alpha$ is between 0.5 and 1. Thus the higher the intrinsic viscosity of a polymer, the higher the molecular weight.

The polymeric material stabilizer additive of this invention may be prepared by any method whereby a preponderant amount of the monomeric methacrylate and a minor amount of chain transfer agent react to form polymeric product having an intrinsic viscosity $[\eta]$ at $30°$ $CHCl_3$ in the range of 0.05 to 0.35 upon suitable polymerization initiation and at acceptable polymerization conditions. Such polymeric material may be recovered in substantially pure form from the polymerization system by known means which include precipitation of the polymer with a nonsolvent, solvent evaporation, filtration or the like. Preferably however the reaction product is obtained at conditions and in such systems such that the entire solution is recovered and employed as recovered and used in amounts providing the polymeric material in the above-defined range.

The monomeric $C_3$ to $C_5$ methacrylates are appreciably more suited to the preparation of the polymeric materials than the methacrylate esters of the ethyl or lower alcohols or of the hexyl or higher alcohols. The normal butyl methacrylate and the isobutyl methacrylates are particularly desirable.

The chain transfer agents include the known chain transfer agents such as mercaptans, halo compounds such as carbon tetrabromide or carbon tetrachloride, compounds with allylic hydrogen, or the like which act in known manner in the noninterference with the kinetic chain which acts with the aid of the transfer reaction to produce several polymer chains. While it is not surprising that the chain transfer agent usage here has the result under the appropriate conditions of providing the polymeric material product in the relatively shorter polymer chain lengths as indicated by the lower values of intrinsic viscosity, it was discovered that the polymeric materials thus obtained are surprisingly more effective than the high molecular weight homopolymers derived from similar monomeric methacrylates in some somewhat related use systems and distinctively different in other systems not too otherwise dissimilar.

A particularly surprising result was discovered in finding that certain compounds having vinylic H, particularly dibutyl maleate and dibutyl fumarate, are particularly effective in the role of transfer agents in giving an effective polymeric material of excellent stabilizing nature either as the polymeric material itself or more particularly when the entire polymerization system is such as to permit its use in its entirety as recovered.

It is, therefore, among the objects of this invention to a. to provide a polyvinyl resin foamed product of desirable nature including fine pore structure, with the pores uniformly sized and distributed throughout the structure;

b. to provide increased tolerance in the ability of emulsion grade plastic resin to accommodate extender (suspension) grade resin and still produce quality product;

c. to provide greater processing latitude in times and temperatures in the preparation of products, particularly at unusually high fusion temperatures previously considered detrimental to the production of quality product;

d. to increase the capacity of precursor formulations for higher filler loading and for greater pigmentation;

e. to provide precursor formulations amenable to ready processing by injection molding and by calendering; and f. to provide enhanced manipulative techniques through utilization of properties associated with and in accordance with the products and processes of the invention. These and other related objects will be apparent from the detailed description and examples which follow. While the following material describes a preferred mode of operation and various typical embodiments, it is understood that the presentation is of an instructive and illustrative nature.

DETAILED DESCRIPTION OF THE INVENTION

As noted above the chain transfer controlled polymerization of the $C_3$–$C_5$ methacrylate may be effected in any appropriate manner. The practical system is typically one involving a solvent characterized in its ability to dissolve the precursors and product and is employed in an amount ranging from the minimum required for such solvation to a maximum limited, more for practical reasons than for effect on the reaction, to about 2 times by weight of the weight of the $C_3$–$C_5$ methacrylate involved. Such solvent is further required to be non-reactive in the precursor composition in the absence of a suitable polymerization initiator although the solvent may be reactive in the presence of an initiator and may of itself have chain transfer properties. Such a solvent must be compatible with all of the ingredients as well as with the end use systems when its presence is retained in part or in toto in the polyvinyl chloride foam stabilization. Such solvents, therefore, include mineral spirits, benzene, toluene, xylenes, carbon tetrachloride, chloroform, bis-(2-ethylhexyl)-phthalate, and related materials known and/or determined as suitable.

The polymerization reaction requires the use of an initiator to start the chain formation. Such initiator may be any of the free radical type, of which the various peroxides are embodiments. Benzoyl peroxide is one such suitable initiator. The initiator use requires a measure of care in that it is known excessive amounts may lead to undesirable and possibly violent reactions. Also to be noted is that chain length and thus molecular weight of the polymeric product is sensitive, in addition to the polymerization temperature and the amount and type of chain transfer agent, to the amount of initiator employed and that the chain length decreases inversely with regard to the amount of initiator in the system. To all practical purposes therefore to obtain proper reaction initiation, polymer chain length within the prescribed range and for suitable reaction control the initiator usage level is within the range of 0.1 to 5.0% by weight of the weight of the $C_3$–$C_5$ methacrylate in the polymerization system exclusive of other ingredients such as the solvent.

Thus, typical polymerization precursor systems have 30–50% of the $C_3$–$C_5$ methacrylate monomer, 0.2–5.0% initiator, chain transfer agent of at least 0.5% and up to 20% when the chain transfer agent and the solvent are different and the solvent is not a chain transfer agent and up to about 69% when the solvent is a chain transfer agent.

Of the various methods for the polymerization reaction an unsophisticated method is to have all the ingredients in a reaction zone in an inert atmosphere, e.g., nitrogen, and to effect the reaction by heating the contents at a temperature in the range of 70°–100°C. for a time period in the range of about 3 to 8 hours at about atmospheric pressure with continuous agitation. Exclusive of the above-noted effect of the initiator on molecular weight, the molecular weight tends to be lower at higher temperature.

Another somewhat more sophisticated but fundamentally similar system involves charging the reactor vessel with a portion of the solvent and the monomer with or without a portion of the initiator and/or chain transfer agent or neither and under a nitrogen cover heating to a temperature of 70°–100°C. with stirring. To the reaction zone there is then added simultaneously at a more or less uniform rate over a period of 2 to 8 hours a first solution comprising a mixture comprising the balance of the monomer and transfer agent; and a second solution comprising the balance of the solvent and initiator. For uniformity of product it may be found desirable to maintain the reactant mass at the elevated temperature with continued stirring for an additional period such as 30 to 90 minutes after all of the ingredients have been combined.

Consideration of the following examples will aid in an understanding of procedures and advantages available in accordance with this invention.

EXAMPLE I

A polymeric composition was prepared from a system comprising isobutyl methacrylate and dibutyl maleate. The preparation was as follows:

To a glass lined vessel was charged

| 4.6 | parts by weight | Isobutyl methacrylate |
| 6.9 | parts by weight | Dibutyl maleate |
| 11.5 | parts by weight | Mineral spirits |
| 0.06 | parts by weight | Dibenzoyl peroxide |

The vessel was swept with nitrogen and a slight positive flow of nitrogen was thereafter maintained throughout the reaction period. The contents of the vessel were stirred and heated to 90°C., which temperature was held substantially constant during the subsequent reaction period.

To the stirred contents of the vessel were added simultaneously at uniform rates two separate streams over a 6 hour period of the two solutions shown below.

| | Solution No. 1 Parts by Weight | Solution No. 2 Parts by Weight |
|---|---|---|
| Isobutyl methacrylate | 69.1 | — |
| Dibutyl maleate | 4.6 | — |
| Mineral spirits | 4.6 | 69.0 |
| Dibenzoyl peroxide | — | 0.6 |

The polymerization reaction was continued by maintaining the contents of the vessel at 90°C. for 30 minutes after all solutions were charged to the vessel.

The contents of the vessel were then cooled to about room temperature and recovered. The recovered material was a colorless liquid with a Brookfield Viscosity at room temperature of 650 cps. The NMR spectrographic examination of the product indicated that somewhat more than 95% of the isobutyl methacrylate had polymerized (showed less than 5% isobutyl methacrylate of the original charge); also, that somewhat less than 5% of the original dibutyl maleate was no longer present as the free maleate.

A portion of the product was treated with methanol to precipitate the polymeric material which was separated and recovered. This recovered material was purified by dissolving in acetone, treated with water to again precipitate the polymeric material, and the precipitate was separated and dried. From the dried sample a portion was dissolved in $CHCl_3$ and the intrinsic viscosity $[\eta]$ was determined at 30°C. as being 0.247. The weight average molecular weight was 55,000 and the number average molecular weight was 30,000 as determined by gel permeation chromatography. The NMR and IR spectra were similar to those of homopolymeric isobutyl methacrylate, being unable to distinguish, the structural difference in the overwhelming or smothering situation of the predominantly methacrylate polymer structure.

A formulation was prepared using the following:

| Ingredient | Parts by Weight |
|---|---|
| PVC resin (Geon 124) | 100 |
| DIOP (di-isooctyl phthalate) | 60 |
| BBP (butyl benzyl phthalate) | 20 |
| Epoxidized soybean oil (Paraplex G-62) | 5 |
| Heat Stabilizer (Advastab ABC-7) (Ba-Cd-Zn) | 3 |
| Blowing Agent (Kempore 125) (Azodicarbonamide) | 3 |

This plastisol formulation was employed in foam formation without cell stabilizer additive and with varying amounts of the cell stabilizer product prepared as described above. The several samples without and with added cell stabilizer were spread as a 25 mil coating on release paper and fused and expanded for 1½ minutes at 460°F. Product of the material without the cell stabilizer had a rough surface and had approximately 30 cells per linear inch, a condition unsatisfactory and unacceptable as suitable foam product which generally requires a cell count per linear inch of at least 120. The product of the material containing the cell stabilizer added on the basis of the solids concentration in the recovered product of amounts of 0.2, 0.4, 1.0 and 2.0 parts per 100 parts of the resin had smooth surfaces and cell counts in every case above 170 cells per linear inch. The foam product of the plastisol containing the cell stabilizer had excellent physical and mechanical properties including foam densities in the order of 20 lb/cu.ft.

In the same formulation polymeric products prepared from isobutyl methacrylate having intrinsic viscosities of 0.56 and 1.13 respectively, when formulated and fused in like manner at like concentrations, gave products of generally poor and unacceptable quality in both surface characteristics and low cell counts.

EXAMPLE II

A readily foamable recipe was prepared to illustrate the improvement obtainable in resistance to "overblowing."

| | Parts by Weight |
|---|---|
| Marvinol 53 (paste PVC resin) | 60 |
| Escambia 8200 (extender PVC resin) | 40 |
| DIOP (di-isooctyl phthalate) | 60 |
| BBP (butyl benzyl phthalate) | 10 |
| Paraplex G-62 (epoxidized soybean oil) | 5 |
| Advastab ABC-1 (liquid zinc activator) | 2 |
| Atomite (calcium carbonate) | 10 |
| Azodicarbonamide (blowing agent) | 2 |

In the absence of added cell stabilizer this material when fused at 460°F. for 3½ minutes resulted in a collapsed foam system having rough and irregular distribution of the pores of 30–50 per linear inch. However, when the cell stabilizer of Example I was added to the above formulation in amounts ranging from 0.1 to 1.5 parts by weight based on the weight of contained solids per 100 parts by weight of the resin, the products had excellent and uniform pore sizes and distributions ranging in the order 200 cells per linear inch and densities in the ranges of 18 to 20 lb/cu.ft. In similar runs where the cell stabilizer product of Example I was diluted with added mineral spirits to a level of contained solids of 25% by weight, equally good results were obtained when used in the formulation in the same range of concentration based on weight of contained solids.

A further advantage resides in the use of the cell stabilizer with similar formulations employed in the production of foam covered fabrics which are prepared by first coating the fabric with plastisol, causing the plastisol to foam and fuse and then in a second operation further subjecting the thus coated fabric to heat embossing. Here, the use of the cell stabilizer additive in amounts such as in the order of 0.1 to 0.5 parts by weight per 100 parts of resin reduces to a considerable extent the temperature criticality heretofore normally existing in the prevention of foam collapse during the heat embossing period. The practical temperature range would thus be extended from a range of about 10°F. to a broader range of about 50°F. or greater.

In the same formulation the effectiveness of the cell stabilizer as prepared in Example I on the foam stabilization efficiency over extended time periods is shown in Table 1 below.

Table 1

| | | Cells/inch Foamed at 460°F. | | |
|---|---|---|---|---|
| | | 2 mins. | 3 mins. | 4 mins. |
| No Stabilizer | | 205 | 95 | 40 |
| Stabilizer of this invention | 0.05 phr | 210 | 140 | 130 |
| | 0.1 phr | 200 | 170 | 150 |

EXAMPLE III

The improved tolerance of the high cost paste or plastisol grade resin to the presence of increased amounts of lower cost extender or blending grade resin is shown in connection with a plastisol formulation generally similar to that shown in Example I with the exception that the resin composition was as shown in Table 2 which likewise shows the amount of cell stabilizer employed and the effect on foam quality. The test samples were prepared by forming a 30 mil wet pastisol coating on release paper and foaming and fusing for 2 minutes at 440°F.

Table 2

| PVC Resin | | Cell Stabilizer | |
|---|---|---|---|
| QYKV (Dispersion Resin) % | Pliovic (Extender Resin) M-90 % | of Example I phr | Foam Quality Cells/inch |
| 80 | 20 | 0 | 200 |
| 80 | 20 | 0.5 | 210 |
| 60 | 40 | 0 | 200 |
| 60 | 40 | 0.5 | 200 |
| 40 | 60 | 0 | 30 |
| 40 | 60 | 0.5 | 190 |

The above table shows the presence of the cell stabilizer has a highly beneficial effect at high level usage of extender resin in the formulation.

EXAMPLE IV

A formulation was prepared as follows:

EXAMPLE IV

| A formulation was prepared as follows: | |
|---|---|
| Geon 124 (Paste PVC Resin) | 60 |
| Escambia 8200 (Extender PVC Resin) | 40 |
| DOP (di-(2-ethyl-hexyl) phthalate) | 80 |
| Dythal (dibasic lead phthalate) | 3 |
| Calcium carbonate | as shown |
| Azodicarbonamide | 2 |
| Cell stabilizer | as shown |

Various amounts of calcium carbonate filler were employed and sample systems without and with the cell stabilizer are shown in Table 3 below.

Table 3

| Calcium Carbonate | Cell stabilizer of Example I | Foam Quality |
|---|---|---|
| phr | phr | cells/inch |
| 0 | 0 | 170 |
| 0 | 0.5 | 170 |
| 20 | 0 | 50 |
| 20 | 0.5 | 170 |
| 40 | 0 | 40 |
| 40 | 0.5 | 160 |
| 60 | 0 | 30 |
| 60 | 0.5 | 140 |

The above data show that the use of as little as 20 parts per 100 parts by weight of resin of calcium carbonate filler in the absence of the cell stabilizer results in foam collapse to an unacceptable product. On the other hand with cell stabilizer present acceptable product is obtained when as high as 60 parts by weight per 100 parts by weight of resin of calcium carbonate filler are present.

EXAMPLE V

In the preparation of colored products comprising polyvinyl chloride, the matter of pigmentation is extremely important to the producer. As shown below the use of the cell stabilizer in this invention substantially enhances the ability of polyvinyl chloride systems to tolerate a high order of pigment additive and thereby obtain a desirable richer coloration. A formulation was prepared as follows:

| Marvinol 53 (dispersion resin) | 70 |
|---|---|
| Marvinol 14 (blending resin) | 30 |
| DOP | 20 |
| DIDP (diisodecyl phthalate) | 18 |
| Monoplex NODA (n-octyl n-decyl adipate) | 9 |
| Admix 711 (epoxidized oil) | 5 |
| Vanstay 8300 (Pb stabilizer) | 1.9 |
| Ferro 5078 (Pb stabilizer) | 0.1 |
| Atomite (calcium carbonate) | 15 |
| Azodicarbonamide | 1.8 |
| Carbon black pigment | as shown |
| Foam stabilizer | as shown |

The samples were prepared as cast films and foamed and fused for 4 minutes at 420°F. Comparative data are shown in Table 4. These data show that quality foam product was obtained at carbon black pigmentation loading levels twice as great by the use of the cell stabilizer as in the absence thereof.

Table 4

| Carbon Black Pigment (Bone Black) IVO 100 | | Foam Stabilizer of Example I (polymer basis) | Foam Quality cells/inch |
|---|---|---|---|
| | | phr | |
| 0 | | 0 | 160 |
| 0 | | 0.2 | 160 |
| 5 | | 0 | 155 |
| 5 | | 0.2 | 155 |
| 7 | | 0 | 75 |
| 7 | | 0.2 | 150 |
| 10 | | 0 | 35 |
| 10 | | 0.2 | 140 |

EXAMPLE VI

Advantages of the use of the cell stabilizer of this invention are not limited to free rise PVC foam systems as may be determined in this example concerning a molded foam product of the type utilized in the preparation of soles for shoes. A formulation was prepared as follows:

| VC 100 PM (Injection molding grade of PVC) | 100 |
|---|---|
| DOP (bis-(2-ethylhexyl)-phthalate) | 73 |
| Paraplex G-62 (epoxidized oil) | 8 |
| Actafoam R-3 (commercial heat stabilizer and blowing agent activator) | 2 |
| Stearic acid | 0.15 |
| Atomite (calcium carbonate) | 8 |
| Azodicarbonamide (blowing agent) | 0.75 |
| Foam Stabilizer (of Example I) | as shown |

The above formulations in the various lots as indicated below were separately mixed in a Hobart mixer at low speeds for approximately 10 minutes. Each mixture was fluxed on a 2 roll mill at roll temperatures in the order of 270°–300°F. for 7 minutes. The milled product was sheeted off at 0.25 inch thickness. A suitable mold and unattached cover plate was preheated in a steam heated press at 360°F. for at least 15 minutes and then filled with the cut strip having dimensions of approximately 4 × 1 inch. The cover plate was applied and fastened. Pressure in the press was adjusted at 5000 psig and the mold was maintained at about 360°F. and 5000 psig for 6 minutes. Pressure was released to allow for expansion of the stock and cooling by means of a water flow was effected simultaneously. After approximately 2 minutes the mold assembly was removed from the press and final cooling was effected by immersion in tap water. After the specimens were cooled they were removed from the mold and the products had characteristics shown as in Table 5.

Table 5

| Cell Stabilizer of Example I (phr) | Foam Quality cells/inch | (1) Blow ratio |
| --- | --- | --- |
| 0 | 90 | 1.8 |
| 0.5 | 130 | 1.8 |
| 1.0 | 150 | 1.8 |

(1) Ratio of final foam thickness to unblown stock thickness

EXAMPLE VII

Calendered foam products likewise can be improved when the cell stabilizer of this invention is employed. A recipe was prepared as follows:

| | |
| --- | --- |
| Vygen 110 (calendering grade of PVC) | 100 |
| DIOP (diisooctyl phthalate) | 80 |
| Nuostabe V-1026 (Pb stabilizer) | 2 |
| Stearic acid | 0.4 |
| Azodicarbonamide (blowing agent) | 5 |
| Foam Stabilizer | as shown |

The ingredients were hand mixed and then fluxed on a two roll mill at 260°–280°F. for 7 minutes and then removed from the mill by sheeting off at 30 mils thickness. The sheets were cut into 2 × 2 inch pieces, placed on release paper, and foamed and fused in a mechanical convection oven at 440°F. for 2.5 minutes. The results are shown in Table 6 below.

Table 6

| Foam Stabilizer | (1) Minimum Effective Concentration |
| --- | --- |
| According to U.S. 3,270,032 | 0.45 |
| Of Example 1 | 0.20 |

(1) Quantity of foam stabilizer needed to produce a foam having a cell count of 120 to 150 cells/inch. In the absence of cell stabilizer cell counts are in the 25 to 50 cells/inch range.

EXAMPLE VIII

In a manipulative manner identical with that shown the preparation of the cell stabilizer material of Example I, reaction vessel was charged with

| | | |
| --- | --- | --- |
| Isobutyl methacrylate | 4.6 | parts by weight |
| Dibutyl fumarate | 6.9 | parts by weight |
| Mineral spirits | 11.5 | parts by weight |
| Dibenzoyl peroxide | 0.06 | part by weight |
| n-Dodecyl mercaptan | 0.06 | part by weight |

To this was added the 2 separate solutions, one composed of 69 parts by weight of mineral spirits and 0.6 part by weight of dibenzoyl peroxide; and the second solution composed of

| | | |
| --- | --- | --- |
| Isobutyl methacrylate | 69.1 | parts by weight |
| Dibutyl fumarate | 4.6 | parts by weight |
| Mineral spirits | 4.6 | parts by weight |
| n-Dodecyl mercaptan | 0.6 | part by weight |

The product recovered from this reaction, except for a mild but noticeably different odor, had physical and chemical properties similar to the cell stabilizer product of Example I. When employed as cell stabilizer in like amounts in identical formulations the stabilizing activity in all instances was at least as effective as the demonstrated effectiveness of the cell stabilizer of Example I.

EXAMPLE IX

The procedure of Example I was followed in the preparation of cell stabilizer except that normal butyl methacrylate was substituted for isobutyl methacrylate. The polymeric material in the product had an intrinsic viscosity of 0.23 and was approximately similar in its cell stabilizing and other beneficial aspects to that of the product of the polymerization reaction in Example I.

EXAMPLE X

In a polymerization run similar to that in Example I except that dilauroyl peroxide was used as initiator and no chain transfer agent was employed, the polymer after polymerization reaction at 80°C. had an intrinsic viscosity of above 0.4 and the recovered product was generally ineffective as a cell stabilizer in the formulation of Example I.

EXAMPLE XI

Following the procedure of Example I similar ingredients were employed in the same amounts with the exception that xylene was substituted for the mineral spirits, and the chain transfer agent was changed from dibutyl maleate to 0.7 parts by weight of dodecyl mercaptan. Xylene does exhibit some chain transfer properties. The isolated polymer from the recovered product has an intrinsic viscosity, [$\eta$], of about 0.31. The total product composition in tests of its cell stabilizing effectiveness showed an effective minimum concentration to produce a cell count above 120 cells per linear inch in the plastisol formulation of Example I to be in the order of 0.6 part by weight per 100 parts of resin.

EXAMPLES XII, XIII AND XIV

| Ingredients | XII | XIII | XIV |
| --- | --- | --- | --- |
| Isobutyl Methacrylate | 75 | 75 | 75 |
| Dilauroyl Peroxide | 3 | 3 | 3 |
| Mineral Spirits | 75 | 75 | 75 |
| CBr$_4$ | 1.5 | 1.5 | — |
| CBrCl$_3$ | — | — | 1.5 |

The halogen compound used in Example XII was dissolved in the monomer, while that used in Examples XIII and XIV was added to a 500 mil reaction flask. A volume of solvent equal to that of the monomer and halogen compound dissolved therein was used to dissolve the peroxide, and the remainder of the solvent was placed in the reaction flask. The monomer and solvent solution were then added simultaneously at constant rates over 6 hours to the stirred flask, the contents of which were maintained under nitrogen at 80°C. throughout the addition period, and for ½ hour longer. The solutions were then cooled.

The materials recovered from the several reactions had polymeric products, as measured on separated polymer solids, with intrinsic viscosity values of less than 0.3. The recovered products, unseparated, employed as cell stabilizers in the plastisol formulation of Example I, each exhibited an effective minimum concentration to obtain cell structured product of above 120 cells per linear inch in the range of 0.4 to 0.5 part by weight per 100 parts by weight of resin.

EXAMPLE XV

Two separate batch polymerization reactions were run, each employing 14.2 parts by weight of isobutyl methacrylate dissolved in 30 parts by weight benzene and differing in that one contained 0.2 part by weight dibenzoyl peroxide and 0.1 part by weight of n-dodecyl mercaptan and the other contained 0.1 part by weight of dibenzoyl peroxide. Each batch was stirred at reflux conditions under nitrogen atmosphere for 4 hours. The polymeric material in the product from the batch containing the mercaptan had an intrinsic viscosity of 0.17. The product from the batch containing no mercaptan but also considerably larger than normal amount of initiator had an intrinsic viscosity of 0.30, indicative of the possibility of obtaining relatively low molecular weight product in a system with the chain length shortening effect of a relatively large amount of initiator. In tests on cell stabilizing activity, the sample prepared with the mercaptan showed an appreciably higher foam stabilizing activity than the higher molecular weight material prepared in the absence of mercaptan. The minimum effective concentration to obtain foamed product from the resin formulation of Example I to produce a cell structure above 120 cells per linear inch was 0.3 for the material prepared with mercaptan as opposed to 0.7 part by weight per 100 parts of resin of product prepared in the absence of mercaptan.

The foregoing description has concerned polyvinyl chloride resins and resinous compositions as embodiments of the materials favorably responsive to the stabilizing effect of the stabilizers of the invention. It is to be understood that such descriptive terminology includes those copolymers which are derived from predominantly vinyl chloride with minor amounts of copolymerizable comonomers. For instance the cell stabilizer material of this invention is very effective in stabilizing the relatively low-temperature fused foam carpet backing derived from copolymers of polyvinyl chloride and polyvinyl acetate.

Other tests have demonstrated that the cell stabilizer of the invention provides a marked advance in processing and preparation of quality cellular products where abnormally high processing temperatures are encountered or desired. This feature is highly desirable in that oven residence time can be reduced substantially with a resultant increase of production rate. It has been found that with the cell stabilizer of the invention temperatures as high as 535°F. are feasible for times up to 0.7 minutes and that temperatures up to 550°F. are possible for times as long as 0.5 minutes.

Obviously, many modifications and variations of the invention as hereinbefore set forth may be made without departing from the spirit and scope thereof, and therefore only such limitations should be imposed as are indicated in the appended claims.

What is claimed is:

1. In the process of foaming a vinyl chloride resin plastisol containing a chemically heat decomposable blowing agent the improvement which comprises adding to said plastisol composition a cell stabilizer liquid, on the basis of contained dissolved solids, in an amount in the range of 0.05 to 2.0 parts by weight per 100 parts by weight of fusible vinyl chloride resin, said stabilizer consisting of the total product of the reaction, at polymerization conditions, of a precursor composition of at least one monomeric methacrylate ester of methacrylic acid with a $C_3$ to $C_5$ alcohol; a chain transfer agent selected from the group consisting of dibutyl maleate and dibutyl fumarate; an initiator; and solvent, said solvent being present in an amount at least sufficient for solvation of precursors and product to an amount equal to and no greater than 2 times the weight of monomeric methacrylate ester, and said solvent being non-reactive in the precursor composition, in the absence of said initiator, wherein said precursor composition consists of 0.1 to 20 parts by weight of chain transfer agent and 0.05 to 2.0 parts by weight of initiator per 100 parts by weight of the monomer methacrylate ester, and wherein the separable polymeric material produced from said total product of reaction has an intrinsic viscosity, measured at 30°C. in $CHCl_3$, in the range of 0.05 to 0.35 deciliters per gram.

2. The preparation of foamed cellular bodies in accordance with claim 1 wherein said stabilizer solution is the reaction product of a precursor composition consisting of isobutyl methacrylate as the methacrylate ester, dibutyl maleate as the chain transfer agent, dibenzoyl peroxide as the initiator, and mineral spirits as the solvent.

3. The preparation of foamed cellular bodies in accordance with claim 2 wherein said precursor composition consists of 100 parts by weight of isobutyl methacrylate, 1.0 to 60 parts by weight of dibutyl maleate, 0.4 to 10.0 parts by weight of dibenzoyl peroxide, and from 100 to 200 parts by weight of mineral spirits.

4. The preparation of foamed cellular bodies in accordance with claim 3 wherein said precursor composition consists of 100 parts by weight of isobutyl methacrylate, 15.6 parts by weight of dibutyl maleate, 9.0 parts by weight of dibenzoyl peroxide and 102 parts by weight of mineral spirits.

5. The preparation of foamed cellular bodies in accordance with claim 1 wherein said elevated temperature is above about 500°F.

6. The preparation of foamed cellular bodies in accordance with claim 1 wherein said precursor composition comprises a fusible vinyl chloride resin comprising a major amount of extender resin, and fusion is effected at a temperature of up to 550°F. for a time no greater than 30 seconds.

* * * * *